United States Patent
Endo et al.

(10) Patent No.: US 6,565,473 B2
(45) Date of Patent: May 20, 2003

(54) HYDRAULIC PRESSURE CONTROL APPARATUS FOR AUTOMATIC TRANSMISSION OF VEHICLE

(75) Inventors: Hiroatsu Endo, Toyota (JP); Masatoshi Ito, Toyota (JP); Tatsuya Ozeki, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/046,235

(22) Filed: Jan. 16, 2002

(65) Prior Publication Data
US 2002/0094910 A1 Jul. 18, 2002

(30) Foreign Application Priority Data
Jan. 17, 2001 (JP) ........................................ 2001-008934

(51) Int. Cl.$^7$ ............................................... F16H 31/00
(52) U.S. Cl. ........................................ 475/117; 475/136
(58) Field of Search ................................... 475/117, 136

(56) References Cited

U.S. PATENT DOCUMENTS

| 3,938,409 A | * | 2/1976 | Uozumi ........................ 477/98 |
| 5,944,632 A | * | 8/1999 | Hara et al. ................... 477/158 |
| 6,050,918 A | * | 4/2000 | Kuramoto .................... 477/157 |
| 6,110,072 A | * | 8/2000 | Harada et al. ............... 477/157 |
| 6,482,127 B2 | * | 11/2002 | Katou ......................... 477/192 |

FOREIGN PATENT DOCUMENTS

JP    A 2000-27763    1/2000

* cited by examiner

Primary Examiner—Dirk Wright
(74) Attorney, Agent, or Firm—Oliff & Berridge, PLC (57) ABSTRACT

A hydraulic pressure control apparatus for controlling an automatic transmission of an automotive vehicle, with a pressurized working fluid delivered from a hydraulic pump driven by an electric motor, wherein a pump control device is operated upon starting of the electric motor to start the hydraulic pump, for controlling the electric motor, such that a rate of increase of the operating speed of the hydraulic pump decreases with a decrease in the temperature of the working fluid detected by a temperature detector.

11 Claims, 9 Drawing Sheets

| MANUAL VALVE POSITION | VEHICLE RUNNING MODE | C1 | C2 | B1 |
|---|---|---|---|---|
| B,D | ETC MODE | × | ○ | × |
| B,D | DIRECT CONNECTION MODE | ○ | ○ | × |
| B,D | FORWARD MOTOR DRIVE MODE | ○ | × | × |
| N,P | NEUTRAL | × | × | × |
| N,P | CHARGING & ENGINE START MODE | × | × | ○ |
| R | REVERSE MOTOR DRIVE MODE | ○ | × | × |
| R | FRICTION RUNNING MODE | ○ | × | ○ |

FIG. 11

HYDRAULIC PRESSURE CONTROL APPARATUS FOR AUTOMATIC TRANSMISSION OF VEHICLE

This application is based on Japanese Patent Application No. 2001-008934 filed on Jan. 17, 2001, the contents of which are incorporated hereinto by reference.

BACKGROUND OF THE INVENTION

1. Field of the Invention

The present invention relates in general to a hydraulic pressure control apparatus for an automatic transmission of an automotive vehicle, and more particularly to techniques for controlling an electrically operated hydraulic pump provided as a hydraulic pressure source.

2. Discussion of Related Art

An automatic transmission for an automotive vehicle is provided with hydraulic actuators operable to change its speed ratio, and a hydraulic pressure control apparatus for controlling the hydraulic actuators. This hydraulic pressure control apparatus includes an electrically operated hydraulic pump which functions as a hydraulic pressure source and which is operated by an electric motor. The hydraulic pressure control apparatus is arranged to control the operating speed of the electrically operated hydraulic pump while taking account of the required delivery pressure, the required rate of delivery (including a leakage flow), and the operating efficiency of the pump, so as to minimize the operating speed of the electric motor, for thereby minimizing the required amount of consumption of electric power by the electric motor and the operating noise of the electric motor. The hydraulic pressure control apparatus permits the hydraulic pump to generate a sufficiently high hydraulic pressure available for use on an electric or hybrid vehicle which uses an electric motor as a drive power source.

The above-described hydraulic pressure control apparatus for the vehicle automatic transmission is arranged to control the operating speed of the electric motor on an assumption that the hydraulic pump is continuously operated. This arrangement does not necessary permits an adequate control of the hydraulic pump when the hydraulic pump is initially turned on while it is at rest. Namely, upon starting of the hydraulic pump, hydraulic pipes or conduits connected to the hydraulic pump must be filled with a working fluid, with complete removal of air cavities or bubbles from a mass of the working fluid in the pipes, so that the hydraulic pump becomes actually capable of delivering a pressurized fluid according to its nominal capacity. Accordingly, the capacity of the hydraulic pump is not available during a predetermined initial period of operation of the hydraulic pump. This drawback is serious particularly at a relatively low operating temperature of the hydraulic pump at which the working fluid has a relatively high degree of viscosity.

In view of the drawback described above, there has been proposed a hydraulic pressure control apparatus arranged to temporarily increase the operating speed of the hydraulic pump during an initial period of operation immediately after the starting, so that the hydraulic pump can be operated with its nominal capacity immediately after its starting. JP-A-2000-27763 discloses an example of such a hydraulic pressure control apparatus as applied to an automatic transmission of an automotive vehicle. This hydraulic pressure control apparatus is arranged such that the length of the initial period of operation during which the operating speed of the hydraulic pump is temporarily increased is determined depending upon the temperature of the working fluid, so that the hydraulic pump can be rapidly primed to fill the hydraulic conduits upon starting of the hydraulic pump while it is at rest. This arrangement is effective to minimize the required time of delay from the moment of starting of the hydraulic pump to the moment at which the hydraulic pump becomes capable of producing the nominal output.

The above-described conventional hydraulic pressure control apparatus for the automatic transmission of the automotive vehicle is simply adapted to change the initial high-speed operating period depending upon the operating temperature of the working fluid, for reducing the required delay time from the moment of starting of the hydraulic pump to the moment at which the hydraulic pump becomes operable with the nominal capacity. However, the conventional apparatus is not arranged to control the rate of increase of the operating speed of the hydraulic pump during the initial high-speed operating period. That is, the resistance to rotation of the hydraulic pump increases with an increase in the viscosity of the working fluid, which increases with a decrease of the temperature of the fluid. If the operating speed of the hydraulic pump were increased during the initial period at the same rate as in the subsequent period of normal operation of the pump, vanes of a rotor of the pump, for example, might be damaged due to a stress caused by the resistance to the rotation of the rotor. Alternatively, a suction passage connected to the hydraulic pump might suffer from cavitation due to a rapid increase of the fluid flow velocity caused by a rapid increase of the operating speed of the pump, resulting in a problem of operating noise or air suction into the pump.

SUMMARY OF THE INVENTION

It is therefore an object of the present invention to provide a hydraulic pressure control apparatus for an automatic transmission of an automotive vehicle, which apparatus is arranged so as to prevent a damage of the vanes of the rotor or other components of the hydraulic pump which may otherwise arise upon starting of the pump when the working fluid has a relatively low temperature.

The above object may be achieved according to the principle of this invention, which provides a hydraulic pressure control apparatus for controlling an automatic transmission of an automotive vehicle, with a pressurized working fluid delivered from a hydraulic pump driven by an electric motor, the apparatus including temperature detecting device for detecting a temperature of the working fluid, and pump control means operable upon starting of the electric motor to start the hydraulic pump, for controlling the electric motor, such that a rate of increase of the operating speed of the hydraulic pump decreases with a decrease in the temperature of the working fluid detected by the temperature detecting device.

In the hydraulic pressure control apparatus constructed according to the present invention as described above, the electric motor is controlled by the pump control means, to drive the hydraulic pump such that the rate of increase or rise of the operating speed of the hydraulic pump immediately after its starting decreases with a decrease in the temperature of the working fluid detected by the temperature detecting device. Accordingly, the present hydraulic pressure control apparatus is effective to prevent the problems conventionally encountered upon starting of a hydraulic pump to start an automotive vehicle at a relatively low ambient temperature at which the working fluid has an accordingly high degree of viscosity. That is, the present hydraulic pressure control apparatus effectively prevents damaging of the vanes of a rotor of the hydraulic pump due to an excessively high load acting thereon, and cavitation noises and air suction on the suction side of the hydraulic pump.

According to one preferred form of the present invention, the pump control means is arranged to control the electric motor such that the operating speed of the electric motor is held at a predetermined first value for a predetermined first time after the starting of the hydraulic pump, and is then held at a predetermined second value lower than the predetermined first value, for a predetermined second time. The predetermined first value is preferably substantially equal to a predetermined upper limit of the operating speed at which the hydraulic pump provides its maximum delivery, or a value which is lower than the upper limit by a predetermined amount. According to the present arrangement of the pump control means, the operation of the hydraulic pump at the predetermined first speed value for the predetermined first time permits rapid filling of the hydraulic pipes in the hydraulic pressure control apparatus with the working fluid, making it possible to effectively reduce a required length of time from the moment of starting of the electric motor to the moment at which the delivery of the pressurized fluid from the hydraulic pump is started.

According to one advantageous arrangement of the above-indicated preferred form of the present invention, the hydraulic pump is a vane pump having an inner circumferential surface partially defining a pump chamber, the vane pump including a rotor having an outer circumferential surface, eccentrically disposed in the pump chamber and rotated by the electric motor, and a plurality of vanes which are supported by the rotor such that the vanes are arranged and movable in a radial direction of the rotor, for sliding contact, at outer ends thereof projecting from the outer circumferential surface, with the inner circumferential surface. In this advantageous arrangement, the above-indicated predetermined second value of the operating speed of the hydraulic pumps and the predetermined second time for which the operating speed is held at the predetermined second value may be preferably determined so as to enable the vanes to be moved for sliding contact of the outer ends with the inner circumferential surface. In the present form of the invention, the vanes can be rapidly moved into sliding contact with the inner circumferential surface partially defining the pump chamber, upon starting of the electric motor, even when the temperature of the working fluid is relatively low.

According to another preferred form of this invention, the automatic transmission includes a hydraulically operated frictional coupling device, and the pump control means changes the operating speed of the hydraulic pump from the predetermined first value to the predetermined second value upon determination that the frictional coupling device has been brought to an engaged state as a result of starting of said hydraulic pump, more precisely, as a result of completion of filling of the hydraulic pipes in the hydraulic control apparatus with the working fluid after the starting of the hydraulic pump. This arrangement assures a required minimum time during which the operating speed is held at the predetermined first value, making it possible to avoid an unnecessarily high load on the electric motor.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
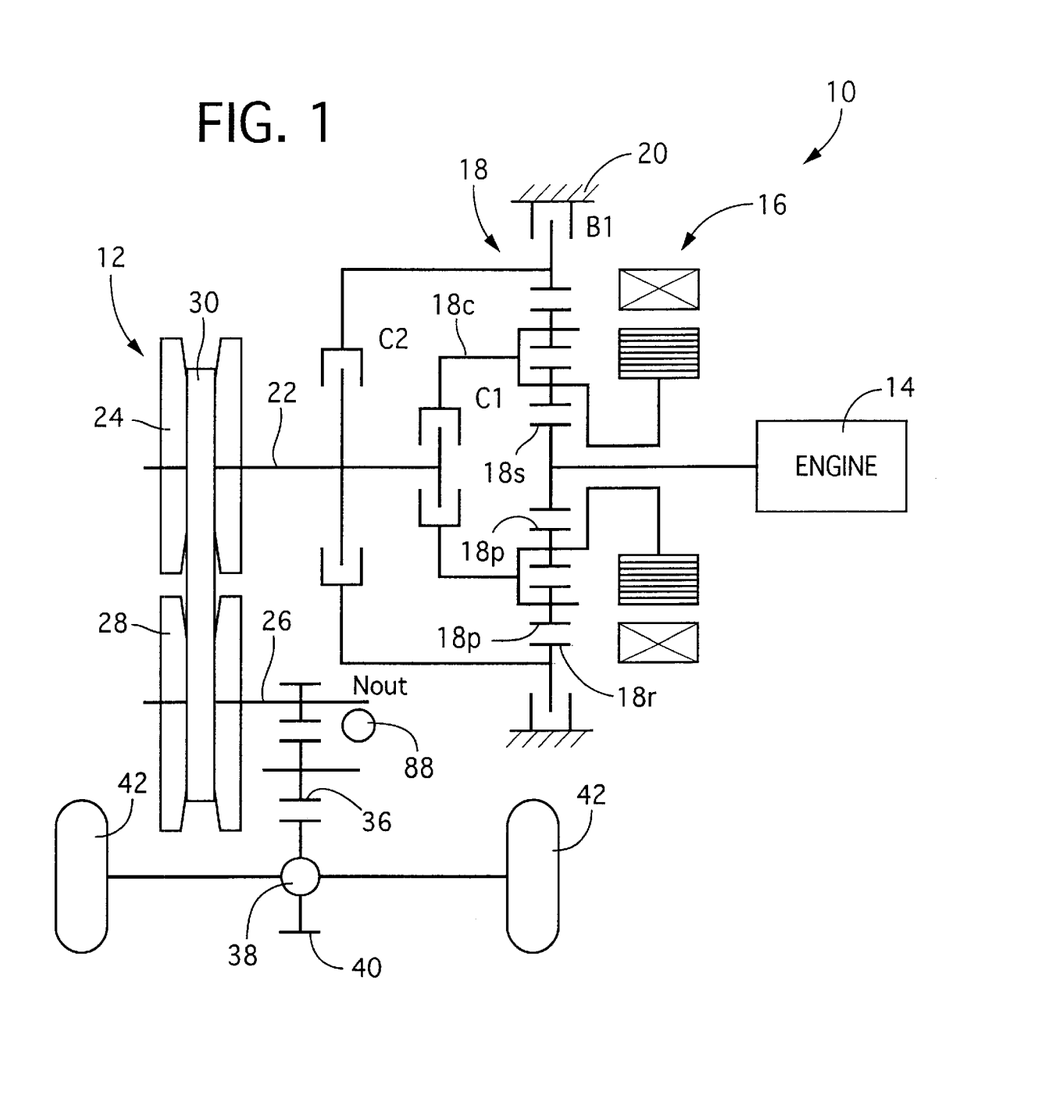
FIG. 1 is a schematic view showing an arrangement of a power transmitting system of an automotive vehicle provided with a hydraulic pressure control apparatus for an automatic transmission, which apparatus is constructed according to one embodiment of the invention.

Referring first to the schematic view of FIG. 1, there is shown a power transmitting system 10 of an automotive vehicle in the form of a so-called "hybrid vehicle) provided with a hydraulic pressure control apparatus for an automatic transmission 12, which apparatus is constructed according to one embodiment of the present invention. The power transmitting system 10 includes an engine 14 such as an internal combustion engine operable by combustion of a fuel, a motor/generator 16 operable selectively as an electric drive motor and an electric generator, a planetary gear device 18 of double-pinion type, and the above-indicated automatic transmission 12. The hybrid vehicle is an FF type (front-engine front drive) vehicle on which the power transmitting system 10 is arranged such that the crankshaft of the engine 14, and input and output shafts 22, 26 of the automatic transmission 12 extend in the transverse direction of the vehicle. The planetary gear device 18 includes a sun gear 18s connected to the engine 14, a carrier 18c connected to the motor/generator 16, and a ring gear 18r connected to a stationary housing 20 of the automatic transmission 12 through a brake B1. The planetary gear device 18 further includes a pair of mutually meshing pinions (planetary gears) 18p which mesh with the ring gear 18r and sun gear 18s and which are rotatably supported by the carrier 18c. The carrier 18c is connected to the input shaft 22 through a first clutch C1, while the ring gear 18r is connected to the input shaft 22 through a second clutch C2. The engine 14 and the motor/generator 16 serve as a drive power source for driving the hybrid vehicle, and the motor/generator 16 and the planetary gear device 18 cooperate to function as a drive-force synthesizing and distributing device of gear type or an electrically controlled torque converter. Further, the sun gear 18s, carrier 18c and ring gear 18r of the planetary gear device 18 serve as a first, a second and a third rotary element.

The automatic transmission 12 is a continuously variable transmission (CVT) of belt-and-pulley type, which includes an input shaft 22, a variable-diameter input pulley 24 mounted on the input shaft 22, an output shaft 24, a variable-diameter output pulley 26 mounted on the output shaft, and a transmission belt 28 connecting the input and output pulleys 24, 26. The input and output pulleys 24, 26 have variable effective diameters. Namely, the effective diameter of the input pulley 24 can be changed by controlling a speed-ratio changing actuator (not shown), so that a speed ratio γ of the automatic transmission 12 can be changed. The speed ratio γ is a ratio of a rotating speed $N_{IN}$ of the input shaft 22 to a rotating speed $N_{OUT}$ of the output shaft 26. That is, $γ=N_{IN}/IN_{OUT}$. On the other hand, the effective diameter of the output pulley 26 can be changed by controlling a tension adjusting actuator (not shown), so that the tension of the transmission belt 30 can be adjusted to adjust a pressing force by which the belt 30 is squeezed or pressed onto the pulleys 24, 26. The tension adjusting actuator is controlled such that the above-indicated pressing force is adjusted to an optimum minimum value. A rotary motion of the output shaft 26 is transmitted through a counter gear 36 to a large-diameter gear 40 of a differential gear device 38, which distributes a received drive force to front right and left drive wheels 42 of the vehicle.

Figure 2:
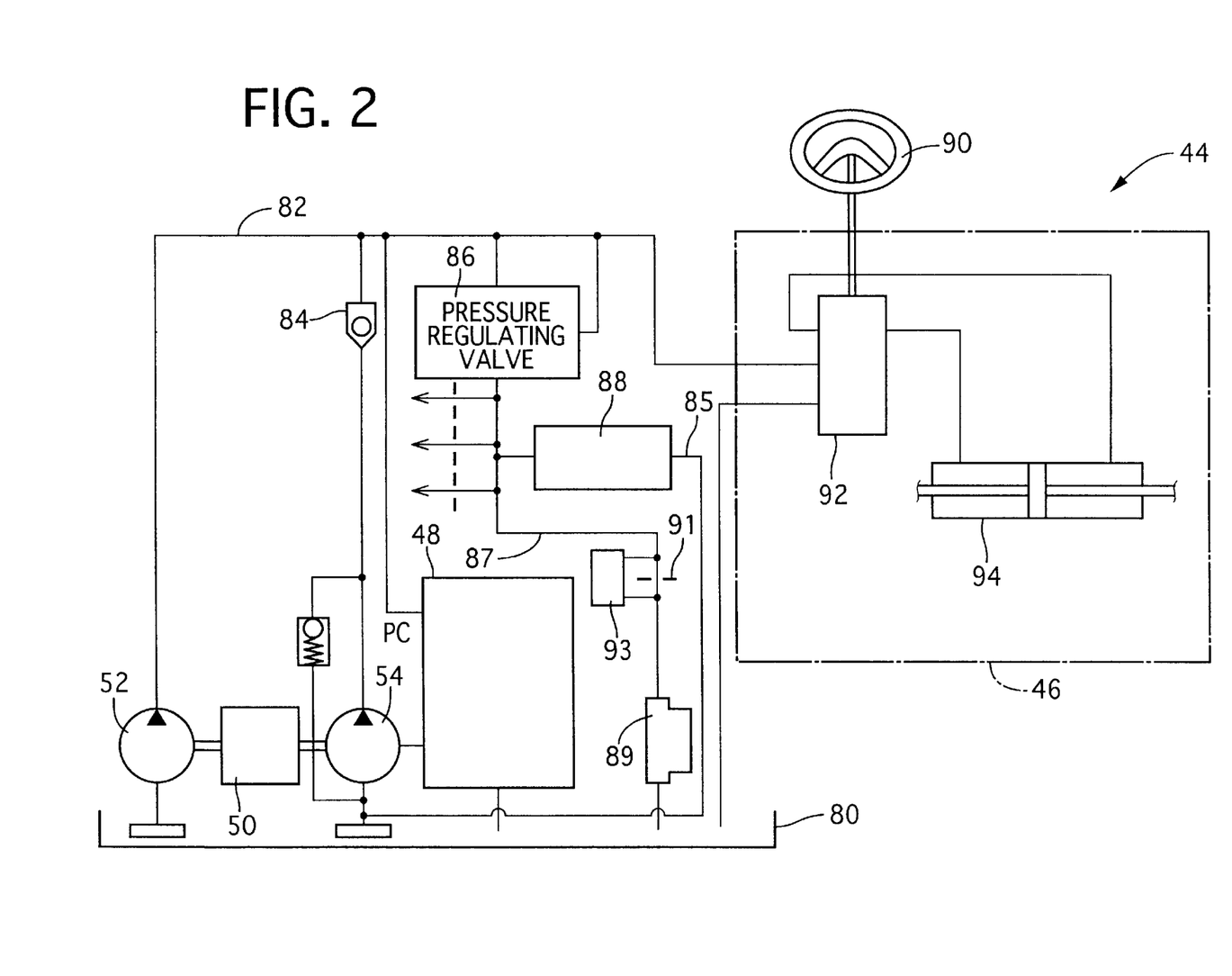
FIG. 2 is a hydraulic circuit diagram schematically showing an arrangement of the hydraulic pressure control apparatus provided on the vehicle of FIG. 1.
Figure 3:
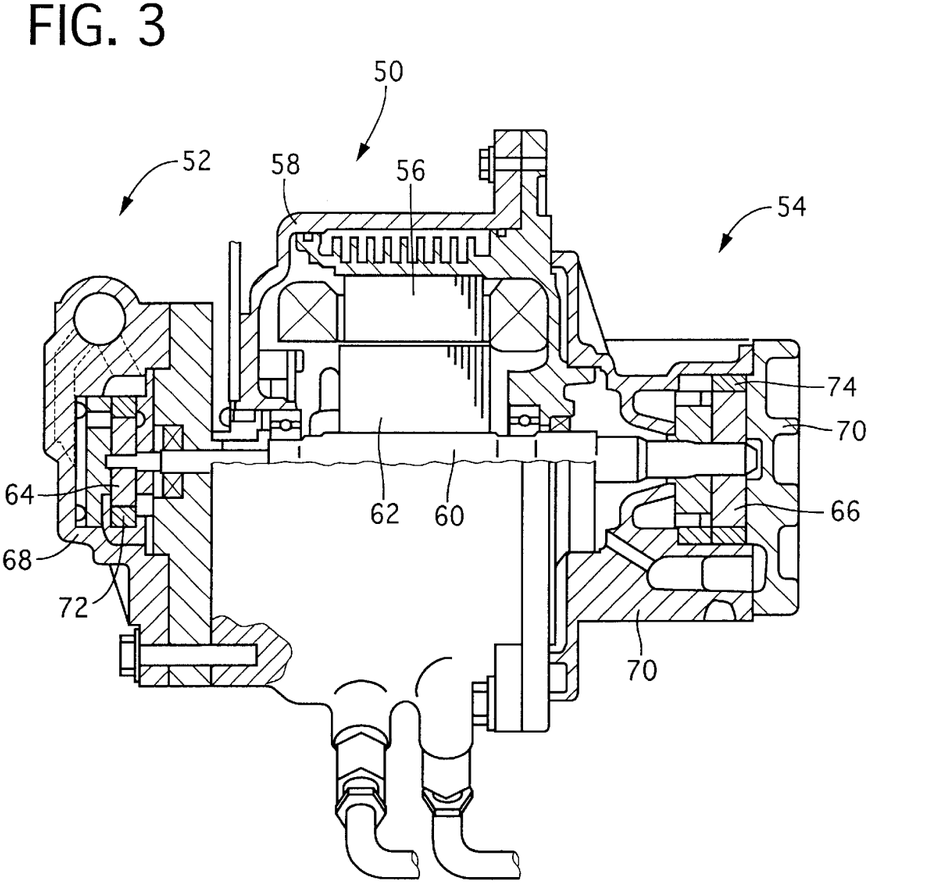
FIG. 3 is an elevational view partly in cross section of an electrically operated hydraulic pump provided in the hydraulic control apparatus of FIG. 2.

Referring next to FIG. 2, the hydraulic pressure control apparatus provided on the vehicle is indicated generally at 44. The hydraulic pressure control apparatus 44 includes a power-steering hydraulic control circuit 46 for a power steering system, and a power-train hydraulic control circuit 48 for shifting the automatic transmission 12 and selecting a running mode of the vehicle. The hydraulic pressure control apparatus 40 includes an electric motor 50, a first hydraulic pump 52 for the power-steering system, and a second hydraulic pump 54 for shifting the automatic transmission 14 and selecting the vehicle running mode. These first and second hydraulic pumps 52, 54 are both driven by the electric motor 50. The first hydraulic pump 52 and the electric motor 50 cooperate to constitute a first electrically operated pump device for the power-steering hydraulic control circuit 44, while the second hydraulic pump 54 and the electric motor 50 cooperate to constitute a second electrically operated pump device for the power-train hydraulic control circuit 46. FIG. 3 shows an integrated electrically operated hydraulic pump device assembly incorporating the electric motor 50 and the first and second hydraulic pumps 52, 54. As shown in FIG. 3, the hydraulic pump device assembly has a motor housing 58 which accommodates a stator coil 56 and a rotor 62 of the electric motor 50. The stator coil 56 is disposed on the inner circumferential surface of the motor housing 58, and the rotor 62 is fixedly mounted on an axially intermediate portion of a shaft 60 which is rotatably supported by bearings fixed to the motor housing 58. The shaft 60 has axially opposite end portions which extend into respective pump housings 68, 70 attached to the corresponding ends of the motor housing 58. The pump housings 68, 70 accommodates the respective first and second hydraulic pumps 52, 54 such that sides of the electric motor 50. The first and second hydraulic pumps 52, 54 have respective rotors 64, 66 in the form of relatively thick circular discs attached to the axially opposite end portions of the shaft 60. Cylindrical cam rings 72, 74 are fixedly fitted in respective recesses in the pump housings 68, 70, and define respective pump chambers. The inner circumferential surfaces of these cylindrical cam rings 72, 74 cooperate with the outer circumferential surfaces of the corresponding rotors 64, 66 to define a pair of arcuate or crescent spaces k as indicated in FIG. 4.

Figure 4:
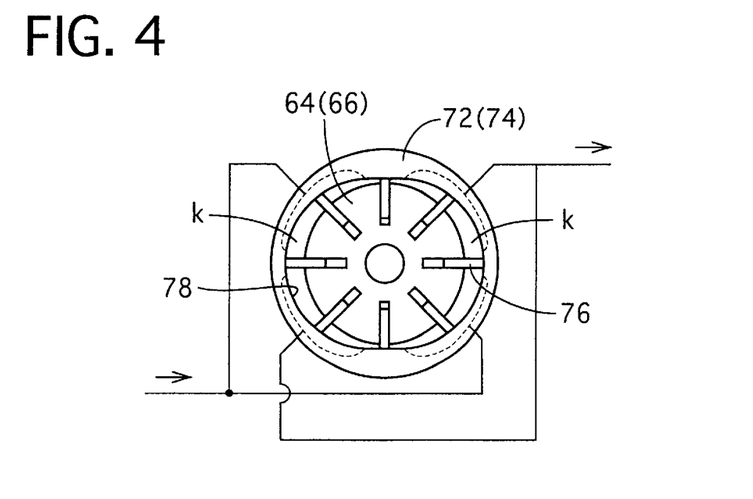
FIG. 4 is a view for explaining vanes of a rotor disposed within the electrically operated hydraulic pump of FIG. 3.

As shown in FIG. 4, each of the rotors 64, 66 accommodated in the respective pump chambers is provided with a plurality of vanes 76 extending radially outwardly from the outer circumferential surface of its body. The vanes 76 are movable in the radial direction of the rotor 66, 68 so that the radially outer end of each vane 76 is held in sliding contact with the inner circumferential surface 78 of the cam ring 72, 74 during rotation of the rotor 66, 68. The inner circumferential surface 78 cooperates with the outer -circumferential surface of the rotor 66, 68 to define the crescent spaces k described. As shown in FIG. 4, the cross sectional area of each crescent space k taken in a plane of FIG. 4 changes in the rotating direction of the rotor 66, 68. A rotary movement of each vane 76 with a rotary movement of the rotor 66, 78 in sliding contact with the inner circumferential surface 78 causes the working fluid to be sucked into the crescent spaces k, pressurized therein and delivered therefrom, as indicated by arrows in FIG. 4.

Referring back to FIG. 2, the first hydraulic pump 52 pressurizes the fluid received from an oil reservoir 80 and delivers the pressurized fluid to a line-pressure passage 82. Similarly, the second hydraulic pump 52 pressurizes the fluid received from the oil reservoir 80 and delivers the pressurized fluid to the line-pressure passage 82, but through a check valve 84. A pressure regulating valve 86 of pressure-relief type is connected to the line-pressure passage 82, to regulate the pressure of the fluid in the line-pressure passage 82, that is, the line pressure. The amount of relief flow of the fluid through the pressure regulating valve 86 is controlled according to a signal received from an electronic control device, so that the line pressure is adjusted to a predetermined level. The hydraulic pressure control apparatus 44 further includes a flow control valve 88 which is arranged to limit a rate of the relief flow of the fluid from the pressure regulating valve 86 toward the power-train hydraulic control circuit 48 and lubrication points within the automatic transmission 12, and permit a residual amount of the fluid to be returned to the oil reservoir 80 through an oil cooler 89. A flow restrictor 91 and a cooler control valve 93 are disposed between the flow control valve 88 and the oil cooler 89. The rate of flow of the fluid into the oil cooler 89 is changed by opening and closing the cooler control valve 93.

The power-steering hydraulic control circuit 46 includes a rotary valve 92 which receives the pressurized fluid through the line-pressure passage 82. The rotary valve 92 is operated by a steering wheel 90 of the vehicle, to control the flows of the pressurized fluid into and from a steering assist cylinder 94 which is provided to produce an assisting force for steering the front wheels 42, such that the assisting force corresponds to an operating force acting on the steering wheel 90.

Figure 5:
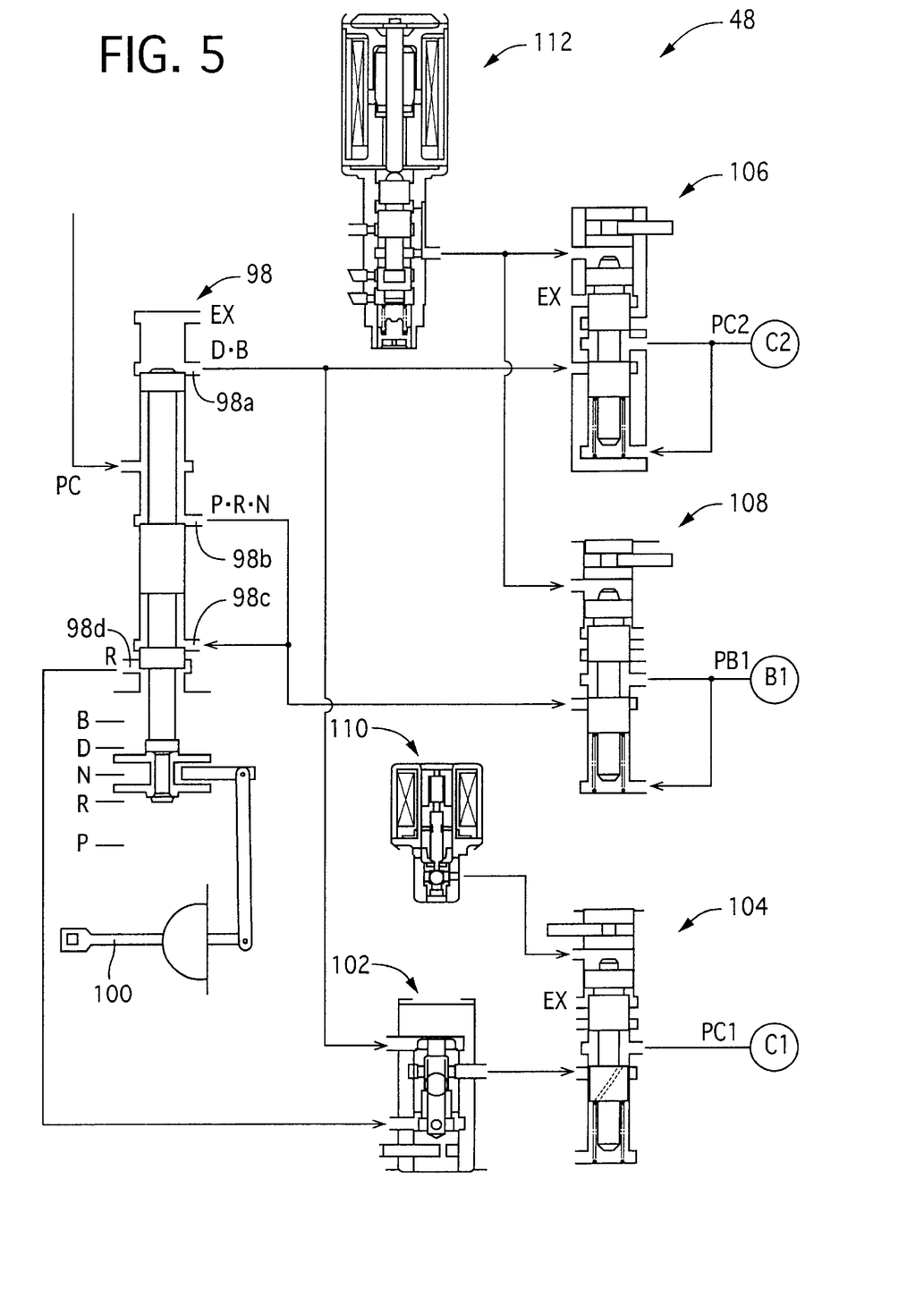
FIG. 5 is a view showing a part of a power-train hydraulic control circuit for the automatic transmission.

Referring next to FIG. 5, there is shown a part of the power-train hydraulic control circuit 48 of the hydraulic pressure control apparatus 44. The power-train hydraulic circuit 48 is provided to control the first and second clutches C1, C2 and the brake B1, which are all hydraulically operated frictional coupling devices of wet multiple disc type. These frictional coupling devices are frictionally engaged by respective hydraulic actuators. In FIG. 5, "PC" represents the line pressure which is obtained by the pressure regulating valve 86, based on the pressurized fluid delivered from the second electrically operated pump device consisting of the electric motor 50 and the second hydraulic pump 54. The line pressure PC is applied to each of the clutches C1, C2 and brake B1 through a manual valve 98, depending upon a presently selected one of five operating positions "B", "D", "N", "R" and "P" of a shift lever 100. The shift lever 100 is operated by an operator or driver of the vehicle to a desired one of the five operating positions. The manual valve 98 is mechanically linked with the shift lever 100, and is shifted to an operating position corresponding to the selected operating position of the is shift lever 100.

When the shift lever 100 is placed in the operating position "B", a comparatively large brake is applied to the vehicle by the drive power source when the automatic transmission 12 is shifted down during a forward running of the vehicle. The shift lever 100 is operated to the position "D", for a normal forward running of the vehicle. In these operating positions "B" and "D", the line pressure PC is applied from an output port 98a of the manual valve 98 to the clutches C1 and C2 through respective control valves 104 and 106. The line pressure PC is applied to the first clutch C1 through a shuttle valve 102. When the shift lever N is placed in the position "N", the drive wheels 42 are disconnected from the drive power source 14, 16. The shift lever 100 is operated to the position "R" to drive the vehicle in the reverse direction. When the shift lever 100 is placed in the position "P", the drive wheels 42 are disconnected from the drive power source, and a mechanical parking brake is applied to the drive wheels 42, by operation of a parking lock mechanism (not shown). In these operating positions, "N", "R" and "P", the line pressure PC is applied from an output port 98b of the manual valve 98 to the brake B1 through a control valve 108. In the position "R", the line pressure PC is also applied to the first clutch C1, through a return port 98c and an output port 98d of the manual valve 98, and the shuttle valve 102 and control valve 104.

Fluid pressures PC1, PC2 and PB1 in the respective clutches C1, C2 and brake B1 are controlled independently of each other by the respective control valves 104, 106, 108 described above, and a solenoid-operated shut-off valve 110 and a linear solenoid valve 112. Described more specifically, the fluid pressure PC1 is controlled by controlling the shut-off valve 110, while the fluid pressures PC2 and PB1 are controlled by controlling the linear solenoid valve 112.

Figure 6:
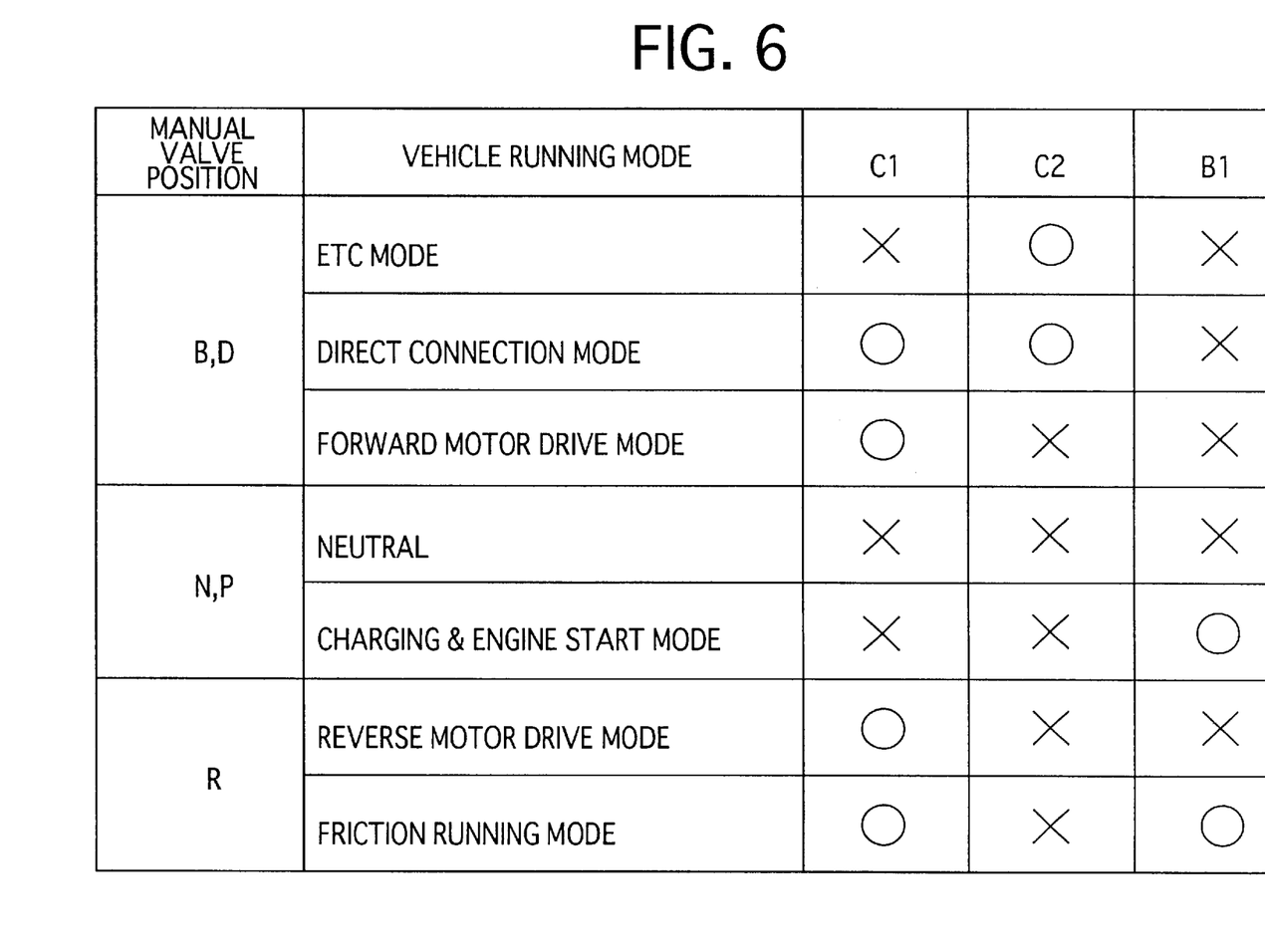
FIG. 6 is a view indicating a relationship between running modes of the vehicle (operating positions of a manual valve) and respective combinations of operating states of hydraulically operated frictional coupling devices provided in the hydraulic pressure control apparatus.

The power transmitting system 10 for the hybrid vehicle has a plurality of vehicle running modes as indicated in FIG. 6. These vehicle running modes are selectively established depending upon the operating states of the clutches C1 and C2 and the brake B1. When the shift-lever 100 is placed in the position "B" or "D", one of an ETC mode, a DIRECT CONNECTION mode and a FORWARD MOTOR DRIVE mode is selectively established. The ETC mode is established by placing the second clutch C2 in the engaged state and placing the first clutch C1 and the brake B1 in the released state. In the ETC mode wherein the sun gear 18s, carrier 18c and ring gear 18r are rotatable relative to each other, the engine 14 and the motor/generator 16 are both operated to apply a torque to the sun gear 18s and carrier 18c, for rotating the ring gear 18r to drive the vehicle in the forward direction. The DIRECT CONNECTION mode is established by placing the two clutches C1 and C2 in the engaged state and placing the brake B1 in the released state. In the DIRECT CONNECTION mode, the engine 14 is operated to drive the vehicle in the forward direction. The FORWARD MOTOR DRIVE mode is established by placing the first clutch C1 in the engaged state and placing the second clutch C2 and the brake B1 in the released state. In the FORWARD MOTOR DRIVE mode, the motor/generator 16 is operated to drive the vehicle in the forward direction. In this mode, a battery 114 (FIG. 7) is charged with an electric energy generated by regenerative control of the motor/generator 16 driven by a kinetic energy of the vehicle while the vehicle is coasting with an accelerator pedal held in the non-operated position.

Figure 7:
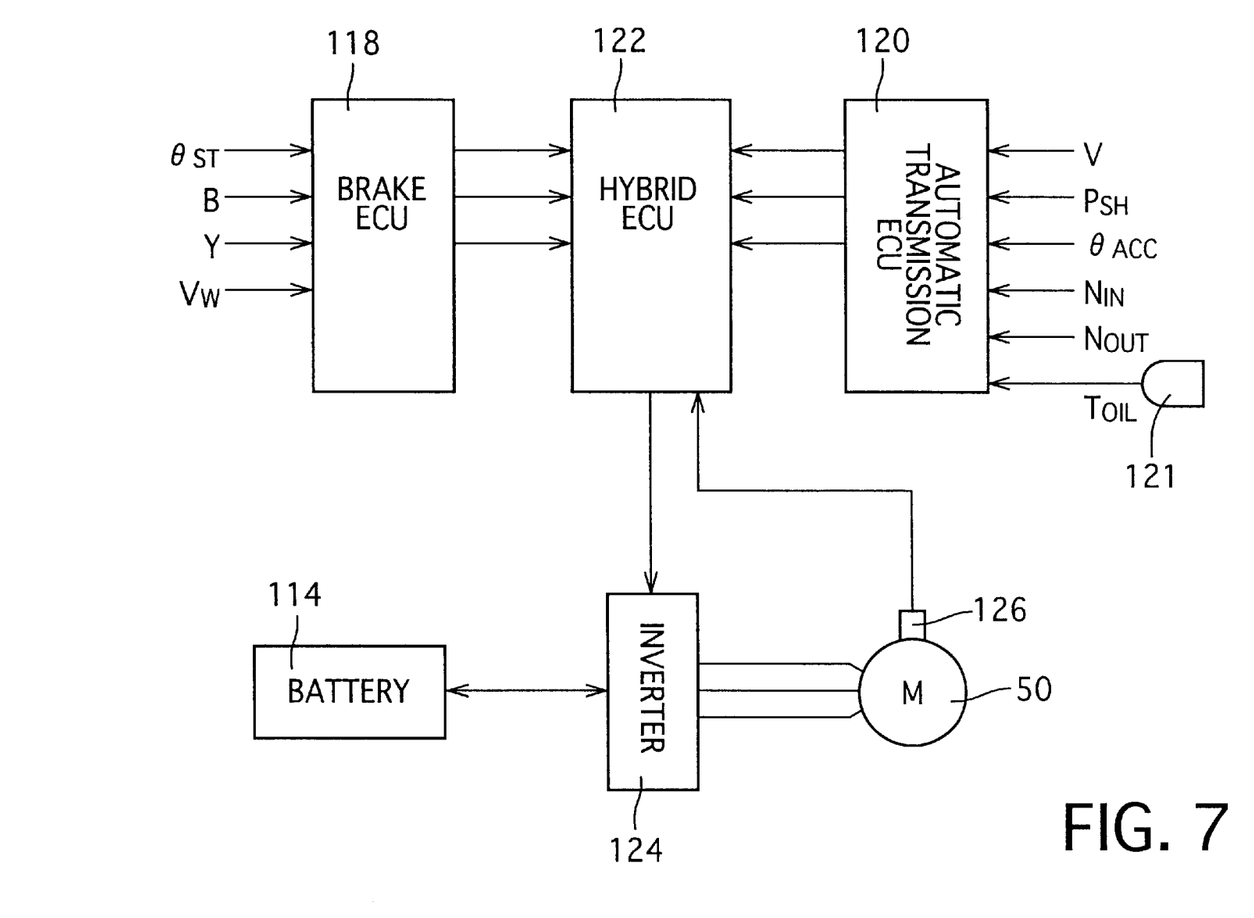
FIG. 7 is a view schematically showing a part of an electronic control system used for the vehicle of FIG. 1.

Referring to FIG. 7, there is shown a part of an electronic control system of the present hybrid vehicle. The electronic control system of FIG. 7 includes an electronic brake control device (brake ECU) 118, and an electronic automatic-transmission control device (automatic transmission ECU) 120, and an electronic hybrid control device (hybrid ECU) 122. The brake control device 118 is principally constituted by a microcomputer incorporating a CPU, a RAM, a ROM and an input-output interface. The electronic brake control device 118 is arranged to receive a signal indicative of a steering angle $\theta_{ST}$ of the steering wheel 90 or the drive wheels 42, a BRAKE-ON signal B generated upon operation of a brake pedal, rotating speeds $V_W$ of the four wheels (including the front drive wheels 42), and a yaw rate Y of the vehicle. The CPU of the brake control device 118 operates to process the input signals according to control programs stored in the ROM, for performing various controls of a braking system of the vehicle, such as an anti-lock braking pressure control and a vehicle turning stability control. In the anti-lock control, the braking system is controlled to brake the vehicle so as to prevent excessive slipping tendencies of the wheels on a road surface when the road surface has a relatively low friction coefficient $\mu$. In the vehicle turning stability control, selected at least one of the wheels is braked to prevent an oversteering or understeering state of the vehicle, that is, to prevent an excessive spinning or drift-out tendency of the vehicle, during turning of the vehicle on a road surface having a relatively low friction coefficient $\mu$. The electronic automatic transmission control device 120 is also principally constituted by a microcomputer as described above, and is arranged to receive signals indicative of a running speed V of the vehicle, rotating speeds $N_{IN}$ and $N_{OUT}$ of the input and output shafts 22, 26 of the automatic transmission 12, an operating amount $\theta_{ACC}$ of the accelerator pedal, the presently selected position $P_{SH}$ of the shift lever 100, and a temperature $T_{OIL}$ of the working fluid in the power-steering hydraulic control circuit 48 or the power-train hydraulic control circuit 44, which is detected by an oil temperature sensor 121 (FIG. 7). The CPU of the automatic transmission control device 120 operates to process the input signals according to control programs stored in the ROM, for shifting the automatic transmission 12 so as to maintain its speed ratio $\gamma$ at an optimum value for maximizing the efficiency of generation and transmission of the drive power. More specifically described, the CPU determines a desired value $\gamma_M$ of the speed ratio $\gamma$ on the basis of the operating amount $\theta_{ACC}$ and the vehicle running speed V, and controls the automatic transmission 12 such that the actual value of the speed ratio $\gamma$ coincides with the determined desired value $\gamma_M$.

The electronic hybrid control device 122, which is also principally constituted by a microcomputer, is connected to the brake control device 118 and automatic transmission control device 120, through communication lines, so that the control devices 118, 120, 122 can receive the necessary signals from each other. The hybrid control device 122 is arranged to receive a signal indicative of an amount of electric energy SOC left in the battery 114, and a signal indicative of an operating speed $N_{OP}$ of the electric motor 50. The CPU of the hybrid control device 122 operates to process the input signals according to control programs stored in its ROM, for selecting one of the vehicle running modes of FIG. 6, on the basis of the amount of electric energy SOC of the battery 114, the operating amount $\theta_{ACC}$ of the accelerator pedal, and the BRAKE-ON signal, and controlling the solenoid-operated shut-off valve 110 and the linear solenoid valve 112 for placing each of the clutches C1, C2 and brake B1 in the appropriate engaged or released state for establishing the selected vehicle running mode. In a CHARGING & ENGINE START mode of FIG. 6, the hybrid control device 122 is also arranged to operate the motor/generator 16 for staring the engine 14 while the brake B1 is held in the engaged state. The hybrid control device 122 is arranged to control an inverter 124 for charging the battery 114 with the electric energy generated by the motor/generator 16, and for controlling the operating speed $N_{OP}$ of the electric motor 50 commonly used to drive the first and second hydraulic pumps 52, 54 provided as the hydraulic power source for the hydraulic pressure control apparatus 44. For instance, the inverter 114 is controlled to apply a 3-phase AC current of several hundreds of volts to the electric motor 50 for controlling the operating speed $N_{OP}$. In FIG. 7, reference numeral 126 denotes a hole element which serves as a motor-speed sensor for detecting the rotating speed $N_{OP}$ of the electric motor 50, that is, the rotating speed of the first and second hydraulic pumps 52, 54.

Figure 8:
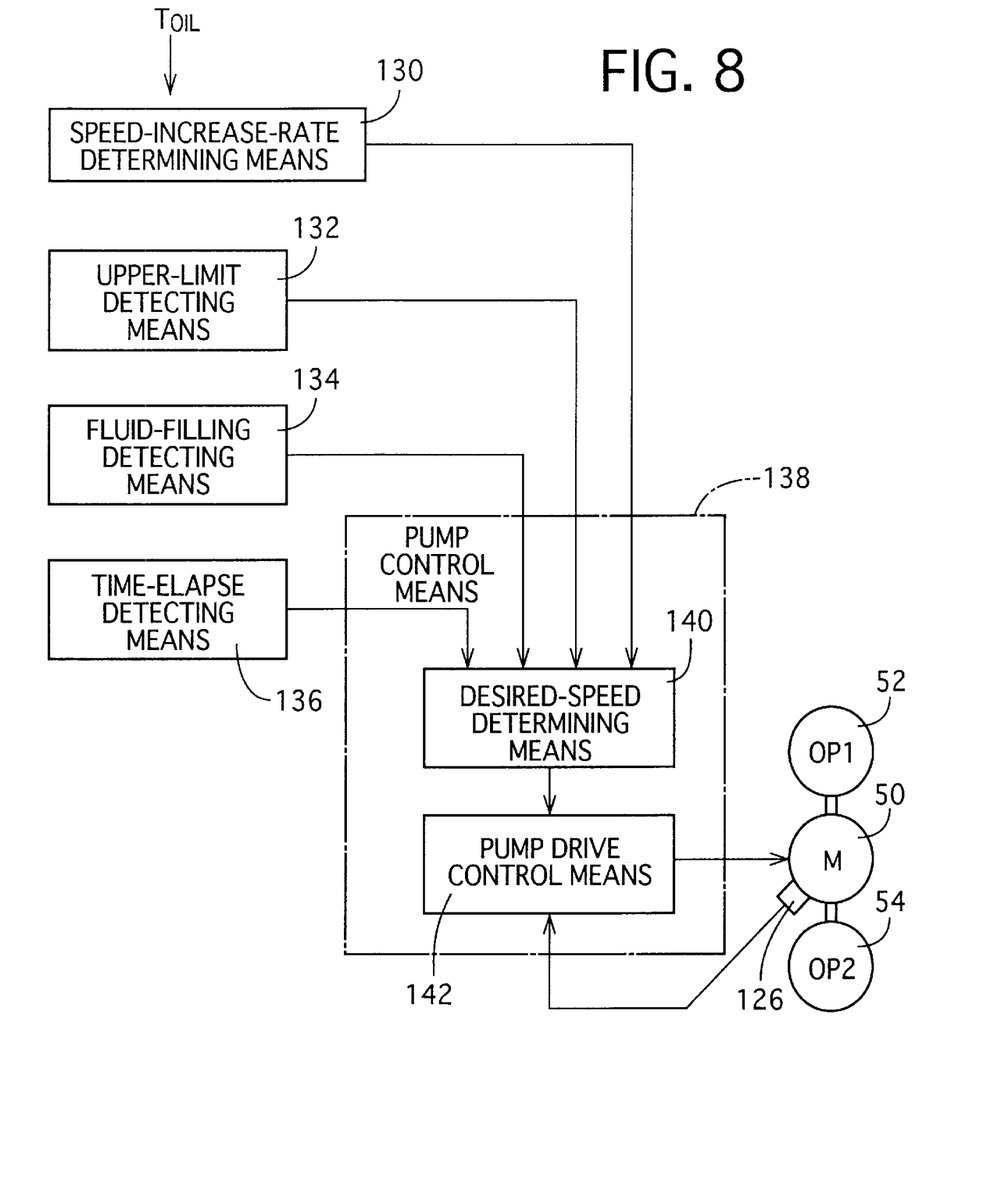
FIG. 8 is a block diagram illustrating various functional means of an electronic hybrid control device.
Figure 9:
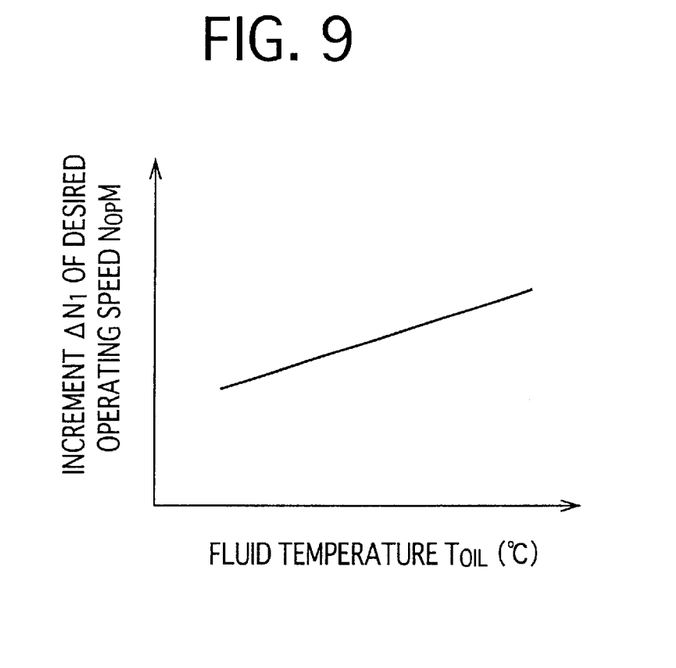
FIG. 9 is a graph indicating a stored predetermined relationship used by speed-increase-rate determining means shown in FIG. 8.

Referring to the block diagram of FIG. 8, there is shown a part of the hybrid control device 122, which includes functional means relating to a starting control of the electric motor 50. As shown in FIG. 8, the hybrid control device 122 includes speed-increase-rate determining means 130, upper-limit detecting means 132, fluid-filling detecting means 134, time-elapse detecting means 136, and pump control means 138. The speed-increase-rate determining means 130 is arranged to determine an increment $\Delta N1$ of a desired value $N_OPM$ of the operating speed $N_{OP}$ of the electric motor 50, on the basis of the detected temperature $T_{OIL}$ of the working fluid in the power-train hydraulic control circuit 44, and according to a predetermined relationship between the increment $\Delta N_1$ and the temperature $T_{OIL}$ as shown in FIG. 9 by way of example. The predetermined relationship, which is represented by data stored in the ROM of the hybrid control device 122, is determined by experimentation such that the increment $\Delta N_1$ decreases with a decrease of the fluid temperature $T_{OIL}$, so that the rate of increase of the actual operating speed $N_{OP}$ of the first and second hydraulic pumps 52, 54 decreases with the decrease of the fluid temperature $T_{OIL}$, for the purpose of preventing damaging of the vanes 76 when the fluid temperature $T_{OIL}$ is relatively low, that is when the viscosity of the fluid is relatively low. The upper-limit detecting means 132 is arranged to determine whether the desired operating speed $N_{OP}M$ of the electric motor 50 immediately after the starting of the electric motor 50 has reached a predetermined upper limit $N_{OPMAXG}$. This upper limit $N_{OPMAXG}$ is determined to be not higher than a predetermined permissible maximum operating speed of the first and second hydraulic pumps 52, 54.

The fluid-filling detecting means 134 is arranged to determine whether the hydraulic pipes or conduits within the power-steering hydraulic control circuit 46 and the power-train hydraulic control circuit 48 have been filled with the working fluid delivered from the first and second hydraulic pumps 52, 54 immediately after the starting of the electric motor 50 (pumps 52, 54), with complete removal of air cavities or bubbles from a mass of the fluid in the pipes. In the present hybrid vehicle, the solenoid-operated shut-off valve 112 in the power-train hydraulic control circuit 48 is energized to place the brake B1 in the engaged state, and the motor/generator 16 is operated to start the engine 14, when an ignition switch and a starter switch are successively turned on. This determination by the fluid-filling detecting means 134 as to whether the hydraulic pipes have been filled with the fluid, that is, as to whether the first and second hydraulic pumps 52, 54 have been started, is effected by determining whether the engine 14 has been started. The determination as to whether the engine 14 has been started is effected by determining whether an operating speed $N_E$ of the engine 14 has increased to a predetermined threshold $N_{E1}$, for example, about 600 r.p.m., with the brake B1 placed in the engaged state. In this respect, it is noted the engagement of the brake B1 is essential to the starting of the engine 14. The time-elapse detecting means 136 is arranged to determine whether a time $t_{EL}$ after the moment of determination that the hydraulic pipes in the power-train hydraulic control circuit 48 have been filled with the fluid has increased to a predetermined value $T_1$, that is, whether the predetermined time $T_1$ has passed after the above-indicated moment of determination. This predetermined time $T_1$ is determined by experimentation such that the vanes 76 of the hydraulic pumps 52, 54 can be fully moved, by a centrifugal force, radially outwardly of the rotors 64, 66, into contact with the inner circumferential surface 78, even when the fluid temperature $T_{OIL}$ is relatively low.

The pump control means 138 includes desired-speed determining means 140 and pump drive control means 142. The desired-speed determining means 140 is arranged to determine the desired operating speed $N_{OP}M$ of the electric motor 50, that is, of the first and second hydraulic pumps 52, 54. The pump drive control means 142 is arranged to control an amount of drive current $I_{OPn}$ to be applied to the electric motor 50, according to the following feedback control equation (1), such that the actual operating speed $N_{OP}$ rises to the desired value $N_{OP}M$ determined by the desired-speed determining means 140, so that the delivery pressure of the pumps 52, 54 can be raised at a rate as high as possible, while preventing the damaging of the vanes 76 of the pumps 52, 54 even at a relatively low ambient temperature.

$$I_{OPn}=I_{FF}+k_P(N_{OP}M-N_{OP})+k_L\int(N_{OP}M-N_{OP})dt+k_D d(N_{OP}M-N_{OP})(1)$$

In the above feedback control equation (1), "$I_{FF}$" represents a feed-forward value determined by the voltage of the battery 114 and the desired operating speed $N_{OP}M$, "$k_P$" represents a proportional control constant, "$k_I$" represents an integral control constant, and "$k_D$" represents a differential control constant.

Figure 10:
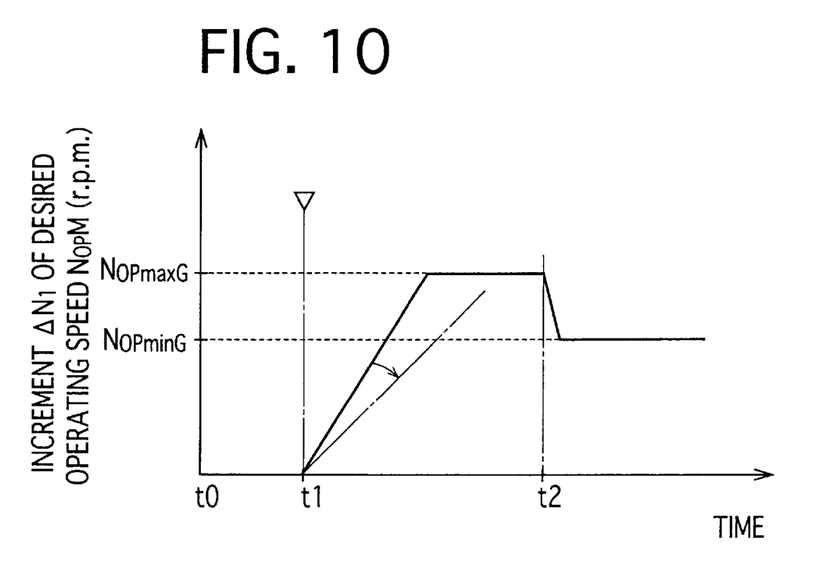
FIG. 10 is a graph indicating a chronological change of a desired operating speed of the hydraulic pump controlled by pump control means shown in FIG. 8.

The desired-speed determining means 140 determines, from time to time, the desired operating speed $N_{OP}M_n$ ($=N_{OP}M_{n-1}+\Delta N_1$) on the basis of the increment $\Delta N_1$ of the desired operating speed $N_{OP}$ determined by the speed-increase-rate determining means 140, such that the rate of increase or rise of the operating speed $N_{OP}$ of the hydraulic pumps 52, 54 upon starting of the hydraulic pumps 52, 54 decreases with a decrease of the temperature $T_{OIL}$ detected by the oil temperature sensor 121. When the upper-limit detecting means 132 has determined that the determined desired operating speed $N_{OP}M_n$ has reached a predetermined first value, that is, a predetermined upper limit $N_{OPmaxG}$, the desired-speed determining means 140 maintains the desired operating speed $N_{OP}M_n$ at this upper limit $N_{OPmaxG}$ until the fluid-filling detecting means 134 has determined that the hydraulic pipes in the power-steering and power-train hydraulic control circuits 46, 48 have been filled with the working fluid. When it is determined that the hydraulic pipes have been filled with the working fluid, the desired-speed determining means 140 lowers the desired operating speed $N_{OP}M_n$ to a predetermined second value, that is, a predetermined lower limit $N_{OPminG}$, which is lower than the upper limit $N_{OPmaxG}$. The desired-speed determining means 140 maintains the desired operating speed $N_{OP}M_n$ at the lower limit $N_{OPminG}$ until the time-elapse detecting means 136 has determined that the time $t_{EL}$ after the hydraulic pipes have been filled with the fluid has reached the predetermined time Ti. When this predetermined time $T_1$ has passed, the desired-speed determining means 140 determines the desired operating speed $N_{OP}M_n$ according to a predetermined equation which is formulated to meet the delivery rate and pressure of the first and second hydraulic pumps 52, 54 that are required for the power-steering and power-train hydraulic control circuits 46, 48. According to the above arrangement, the desired operating speed $N_{OP}M_n$ of the operating speed $N_{OP}$ is determined by the desired-speed determining means 140, as indicated in the graph of FIG. 10 by way of example. In FIG. 10, "t1" indicates a point of time at which the ignition switch provided on the vehicle is turned on, and "t1" indicates a point of time at which the starter switch is turned on. Further, "t2" indicates a point of time at which the fluid-filling detecting means 134 has determined that the operating speed $N_E$ of the engine 14 has reached the predetermined threshold $N_{E1}$, that is, the hydraulic pipes in the hydraulic control circuits 46, 48 have been filled with the fluid.

Figure 11:
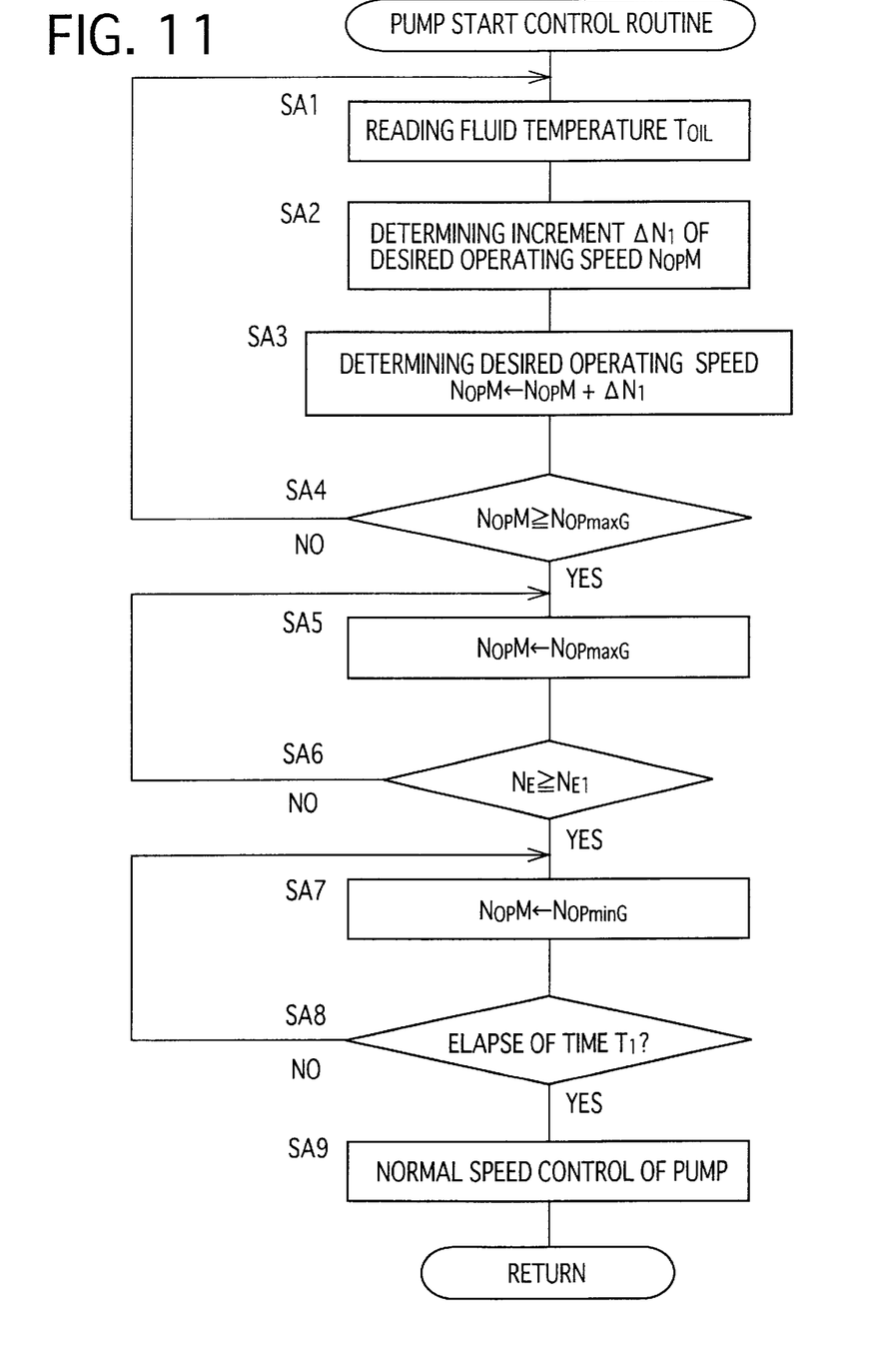
FIG. 11 is a flow chart illustrating a part of a pump start control routine executed by the hybrid control device shown in FIG. 8.

Referring next to the flow chart of FIG. 11, there will be described a pump-start control routine executed by the hybrid control device 122 to start the first and second hydraulic pumps 52, 54. This pump start control routine is executed when the ignition switch and the starter switch are both turned on. The routine is initiated with step SA1 to read the output signal of the oil temperature sensor 121 (FIG. 7), which represents the temperature $T_{OIL}$ of the working fluid within the power-steering and power-train hydraulic circuits 46, 48. Step SA1 is followed by step SA2 corresponding to the speed-increase-rate determining means 130, to determine the increment $\Delta N_1$ of the desired operating speed $N_{OP}M$ of the hydraulic pumps 52, 54, on the basis of the detected temperature $T_{OIL}$ and according to the predetermined relationship between the increment $\Delta N_1$ and the temperature $T_{OIL}$, as shown in FIG. 9 Then, the control flow goes to step SA3 corresponding to the desired-speed determining means 140, to determine the desired operating speed $N_{OP}M_n$ on the basis of the determined increment $\Delta N_1$, more precisely, by adding the increment $\Delta N_1$ to the desired operating speed $N_{OP}M_{n-1}$ determined in the last control cycle. Step SA3 is followed by step SA4 corresponding to the upper-limit detecting means 132, to determine whether the desired operating speed $N_{OP}M_n$ of the electric motor 50 has increased to the predetermined upper limit $N_{OPmaxG}$. If a negative decision (NO) is obtained in step SA4, the control flow goes back to step SA1. Steps SA1–SA4 are repeatedly implemented until an affirmative decision (YES) is obtained in step SA4. Thus, the desired operating speed $N_{OP}M_n$ is increased by the increment $\Delta N_1$ determined from time to time on the basis of the temperature $T_{OIL}$ of the working fluid, immediately after the starting of the electric motor 50 at the point of time t1 indicated in FIG. 10. Since the increment is determined so as to decrease with a decrease in the fluid temperature $T_{OIL}$, the rate of increase or rise of the desired operating speed $N_{OP}M_n$ immediately after the starting of the hydraulic pumps 52, 54 is lowered as the fluid temperature $T_{OIL}$ is lowered. One-dot-chain line in FIG. 10 indicates the rate of increase of the desired operating speed $N_{OP}M_n$ where the fluid temperature $T_{OIL}$ is relatively low.

When the affirmative decision (YES) is obtained in step SA4, the control flow goes to step SA5 which also corresponds to the desired-speed determining means 140. In this step SA5, the desired operating speed $N_{OP}M_n$ determined in step SA3 is replaced by the predetermined upper limit $N_{OPmaxG}$. Thus, the desired operating speed $N_{OP}M$ is limited to the upper limit $N_{OPmaxG}$. Step SA5 is followed by step SA6 corresponding to the fluid-filling detecting means 134, to determine whether the engine speed $N_E$ has increased to the predetermined threshold $N_{E1}$, that is, whether the hydraulic pipes in the power-steering and power-train hydraulic control circuits 46, 48 have been filled with the working fluid, with complete removal of air cavities or bubbles from the fluid mass in the pipes. Steps SA5 and SA6 are repeatedly implemented until an affirmative decision (YES) is obtained in step SA6. Namely, the desired operating speed $N_{OP}M$ is maintained at the upper limit $N_{OPmaxG}$ until the hydraulic pipes have been filled with the working fluid.

When the affirmative decision (YES) is obtained in step SA6, the control flow goes to step SA7 which also corresponds to the desired-speed determining means 140. In this step SA7, the desired operating speed $N_{OP}M$ which has been maintained at the upper limit $N_{OPmaxG}$ is lowered to the predetermined lower limit $N_{OPminG}$. In the example of FIG. 10, the affirmative decision (YES) is obtained in step SA7 at the point of time t2. Step SA7 is followed by step SA8 corresponding to the time-lapse detecting means 136, to determine whether the time $t_{EL}$ after the hydraulic pipes in the hydraulic control circuits 46, 48 were filled with the fluid (after the affirmative decision was obtained in step SA6) has reached the predetermined time T1, that is, time T1 has passed after the affirmative decision (YES) was obtained in step SA6. Steps SA7 and SA8 are repeatedly implemented until an affirmative decision (YES) is obtained in step SA8. Thus, the desired operating speed $N_{OP}M_n$ is maintained at the lower limit $M_{OPminG}$ for the predetermined time T1. When the affirmative decision (YES) is obtained in step SA8, the control flow goes to step SA9 also corresponding to the desired-speed determining means 140, to determine the desired operating speed $N_{OP}M_n$ so that the delivery rate and pressure of the hydraulic pumps 52, 54 are controlled to values suitable for normal functioning of the power-steering hydraulic control circuit 46 and the power-train hydraulic control circuit 48.

In the hydraulic pressure control apparatus 44 according to the present embodiment of this invention, the electric motor 50 is controlled by the pump control means 138, to drive the first and second hydraulic pumps 52, 54 such that the rate of increase or rise of the operating speed $N_{OP}$ of the pumps 52, 54 immediately after their starting is lowered as the temperature $T_{OIL}$ of the working fluid detected by the oil temperature sensor 121 is lowered. Accordingly, the present hydraulic pressure control apparatus 44 is effective to prevent the problems conventionally encountered upon starting of a hydraulic pump to start an automotive vehicle at a relatively low ambient temperature at which the working fluid has an accordingly high degree of viscosity. That is, the present hydraulic pressure control apparatus 44 effectively prevents damaging of the vanes 76 of the rotors 64, 66 of the hydraulic pumps 52, 54 due to an excessively high load acting thereon, and cavitation noises and air suction on the suction side of each hydraulic pump 52, 54.

The pump control means 138 in the present embodiment is further arranged such that the operating speed of the hydraulic pumps 52, 54 is held at the predetermined first value, that is, at the upper limit $N_{OPmaxG}$, for a predetermined first time, and is then maintained at the predetermined second value lower than the first value, that is, at the lower limit $N_{OPminG}$ for a predetermined second time, namely, for the predetermined time T1. The operation of the hydraulic pumps 52, 54 at the upper limit $N_{OPmaxG}$ for the predetermined time permits rapid filling of the hydraulic pipes in the hydraulic control circuits 46, 48 with the working fluid, making it possible to effectively reduce a required length of time from the moment of starting of the electric motor 50 to the moment at which the delivery of the pressurized fluid from the hydraulic pumps 52, 54 is started.

In the present embodiment, each of the two hydraulic pumps 52, 54 is a vane pump having the inner circumferential surface 78 partially defining the pump chamber (k). The vane pump includes the rotors 64, 66 having an outer circumferential surface, disposed in the pump chamber and rotated by the electric motor 50, and the vanes 76 which are supported by the rotor such that the vanes are arranged and movable in the radial direction of the rotor, for sliding contact, at outer ends thereof projecting from the outer circumferential surface, with the inner circumferential surface 78. The above-indicated predetermined second value of the desired operating speed $N_{OP}M$ of the hydraulic pumps 52, 54, that is, the predetermined lower limit $N_{OPminG}$ and the predetermined time $T_1$ for which the desired operating speed $N_{OP}M$ is maintained at the lower limit $N_{OPminG}$ are determined to enable the vanes 76 to be moved for sliding contact with the inner circumferential surface 78, so that the vanes 76 can be rapidly moved into sliding contact with the inner circumferential surface 78 upon starting of the electric motor 50, even when the temperature $T_{OIL}$ of the working fluid is relatively low.

The pump control means 138 is arranged to lower the desired operating speed $N_{OP}$ from the upper limit $N_{OPmaxG}$ to the lower limit $N_{OPminG}$ when the brake B1 as one of the frictional coupling devices of the automatic transmission 12 has been brought to its engaged state as a result of completion of filling of the hydraulic pipes in the hydraulic control circuits 46, 48 with the working fluid after the starting of the hydraulic pumps 53, 54. This arrangement assures a required minimum time during which the desired operating speed $N_{OP}$ is held at the upper limit $N_{OPmaxG}$, making it possible to avoid an unnecessarily high load on the electric motor 50.

While the presently preferred embodiment of this invention has been described above by reference to the drawings, for illustrative purpose only, it is to be understood that the invention may be embodied otherwise.

While the hydraulic pressure control apparatus 44 of the illustrated embodiment is used for the hybrid vehicle employing the engine 14 and the motor/generator 16 as the drive power source, the principle of this invention is equally applicable to an ordinary automotive vehicle employing only an engine as the sole drive power source, which engine is operatively connected to an automatic transmission through a torque converter.

Although the automatic transmission 12 controlled by the hydraulic pressure control apparatus 44 is a belt-and-pulley type continuously variable transmission (CVT), the hydraulic pressure control apparatus of the present invention is equally applicable to an automatic transmission including a plurality of planetary gear sets whose rotary elements are selectively connected to each other to selectively establish a plurality of speed ratios.

The pump control means 180 in the illustrated embodiment is arranged to control the electric motor 50 in a closed-loop or feedback fashion according to the feedback control equation (1) described above, such that the actual operating speed $N_{OP}$ of the electric motor 50 (hydraulic pumps 52, 54) coincides with the desired value $N_{OP}M_n$ However, the electric motor 50 need not be controlled in a feedback fashion, but in an open-loop fashion. In the illustrated embodiment, the oil temperature sensor 121 is used to detect the temperature TOIL of the working fluid in the hydraulic control circuit 46 or 48. However, the oil temperature sensor 121 may be replaced by a temperature estimating device adapted to estimate the temperature of the working fluid in the hydraulic control circuits 46, 48, on the basis of the ambient temperature or a temperature of the intake air or cooling water of the engine 14.

While the single common electric motor 50 is used to drive the first and second hydraulic pumps 52, 54, two electric motors may be used to drive the first and second hydraulic pumps 52, 54, respectively.

It is to be understood that the present invention may be embodied with various other changes, modifications and improvements, which may occur to those skilled in the art, without departing from the spirit and scope of the invention defined in the following claims:

What is claimed is:

1. A hydraulic pressure control apparatus for controlling an automatic transmission of an automotive vehicle, with a pressurized working fluid delivered from a hydraulic pump driven by an electric motor, comprising:

temperature detecting device for detecting a temperature of the working fluid; and pump control means operable upon starting of said electric motor to start said hydraulic pump, for controlling said electric motor, such that a rate of increase of an operating speed of said hydraulic pump decreases with a decrease in the temperature of the working fluid detected by said temperature detecting device.

2. A hydraulic pressure control apparatus according to claim 1, wherein said pump control means controls said electric motor such that the operating speed of the electric motor is held at a predetermined first value for a predetermined first time after said starting of said hydraulic pump, and is then held at a predetermined second value lower than said predetermined first value, for a predetermined second time.

3. A hydraulic pressure control apparatus according to claim 2, wherein said predetermined first value of the operating speed of the electric motor is substantially equal to a predetermined permissible maximum operating speed.

4. A hydraulic pressure control apparatus according to claim 2, wherein said hydraulic pump is a vane pump having an inner circumferential surface partially defining a pump chamber, said vane pump including a rotor having an outer circumferential surface, eccentrically disposed in the pump chamber and rotated by the electric motor, and a plurality of vanes which are supported by said rotor such that the vanes are arranged and movable in a radial direction of said rotor, for sliding contact, at outer ends thereof projecting from said outer circumferential surface, with said inner circumferential surface.

5. A hydraulic pressure control apparatus according to claim 4, wherein said predetermined second value of the operating speed of said hydraulic pumps and said predetermined second time for which said operating speed is held at the predetermined second value are determined so as to enable said vanes to be moved for sliding contact of said outer ends with said inner circumferential surface.

6. A hydraulic pressure control apparatus according to claim 1, wherein said automatic transmission includes a hydraulically operated frictional coupling device, and said pump control means changes the operating speed of said hydraulic pump from said predetermined first value to said predetermined second value upon determination that said frictional coupling device has been brought to an engaged state as a result of starting of said hydraulic pump.

7. A hydraulic pressure control apparatus according to claim 1, wherein said pump control means includes desired-speed determining means for a desired value of the operating speed of said hydraulic pump on the basis of the temperature of the working fluid detected by said temperature detecting device, and pump drive control means for controlling an amount of electric current to be applied to said electric motor such that an actual value of the operating speed coincides with said desired value determined by said desired-speed determining means.

8. A hydraulic pressure control apparatus according to claim 7, further comprising speed-increase-rate determining means for determining an increment of said desired value of the operating speed of said hydraulic pump at a predetermined time interval, on the basis of said temperature of the working fluid, and wherein said desired-speed determining means determines a present value of said desired value by adding said increment determined by said speed-increase-rate determining means, to a last value of said desired value.

9. A hydraulic pressure control apparatus according to claim 8, wherein said speed-increase-rate determining means determines said desired value such that said desired value decreases with a decrease of said temperature of the working fluid.

10. A hydraulic pressure control apparatus according to claim 1, wherein said automotive vehicle is a hybrid vehicle including an engine and a motor/generator as a drive power source, and a planetary gear device operatively connected to said engine, said motor/generator and said automatic transmission through a plurality of frictional coupling devices which are operated by the pressurized working fluid delivered from said hydraulic pump.

11. A hydraulic pressure control apparatus according to claim 10, wherein said hybrid vehicle further includes a power-steering system which is also operated by the pressurized working fluid delivered from said hydraulic pump.

* * * * *